United States Patent Office

2,989,510
Patented June 20, 1961

2,989,510
HIGH MOLECULAR WEIGHT POLYMER AND PROCESS THEREFOR
George J. Bruni, Springfield, N.J., assignor to Celanese Corporation of America, New York, N.Y., a corporation of Delaware
No Drawing. Filed June 20, 1958, Ser. No. 743,489
14 Claims. (Cl. 260—67)

This invention relates to an improved method for producing a tough, high molecular weight material by the polymerization of trioxane.

It is known that trioxane may be polymerized in the presence of small amounts of certain catalytic materials, principally fluorine-containing materials, to produce a tough, high molecular weight polymer, known as polyoxymethylene which may be used to produce molded or extruded products. The procedures utilized involve the blending of molten trioxane with the catalytic material, when the latter is normally solid or normally liquid material or the contacting of the gasiform catalytic material with molten or solid trioxane. The use of gasiform catalytic material involves obvious handling difficulties and does not effect uniform contact between the reactants.

Such procedures, even with solid or liquid catalytic materials, are disadvantageous in that they are not readily adaptable to large scale and particularly to continuous production methods. They are also disadvantageous, particularly with rapidly acting catalytic materials in that they do not permit uniform admixture of the reaction components before substantial reaction takes place.

In an improved process, disclosed in application Serial No. 691,145, filed October 21, 1957, by Donald E. Hudgin and Frank Berardinelli trioxane is dissolved in a large volume of a non-aqueous solvent and polymerization takes place in solution with the polymer precipitating out of solution as it is formed. However, polymerization generally proceeds more slowly in solution probably due to the dilution of the monomer molecules by molecules of solvent and consequently less frequent collisions between monomer molecules. Also, the catalyst tends to concentrate on the growing polymers. The resulting localized high catalyst concentrations tend to limit the molecular weight of the polymer and the depletion of other parts of the solution tends to lower yields.

In another improved process, disclosed in the copending application of Donald E. Hudgin and Frank Berardinelli, Serial No. 691,142, filed October 21, 1957, trioxane is polymerized as a dispersed phase suspended in a non-solvent liquid. Such a procedure increases the speed of reaction and the yield of polymer, but does not increase the molecular weight of the polymer to a great extent.

It is an object of this invention to provide a method for the rapid production of high molecular weight polyoxymethylene in high yields. Other objects will appear hereinafter.

The objects of this invention are achieved by a process which comprises initiating the polymerization of trioxane in solution in an inert non-aqueous solvent in the presence of a trioxane-polymerization catalyst and continuing the polymerization of the trioxane at a temperature not higher than about 2° C. above the precipitation temperature for said trioxane in solution.

In accordance with the process, as usually carried out, polymerization is initiated at a moderately elevated temperature in a solution containing a relatively high concentration of trioxane. After the polymerization is initiated, the temperature is reduced to precipitate solid trioxane from solution and the polymerization is permitted to proceed to completion, or to any desired degree. The continuation of polymerization may be carried out without precipitation, provided that it is carried out at a temperature just above the precipitation temperature. In this case, the polymerization initiation and continuation may both be carried out in the same narrow temperature range.

It has been found that particles of solid trioxane suspended directly from solid phase without solution as by mechanical grinding, do not polymerize in high yield to the high molecular weight products of this invention. It has also been found that when trioxane is precipitated from solution in an inert non-aqueous solvent and polymerization is thereafter begun by addition of the polymerization catalyst, high yields of molecular weight products are not produced.

The temperature for polymerization initiation will depend upon the nature of the solvent, the trioxane concentration therein and the nature of the polymerization catalyst. In general, temperatures between about 10° and about 110° C. will be used and preferably between about 45° and 75° C.

The solvent may be any inert, non-aqueous and preferably substantially non-polar organic solvent for trioxane. Among the inert, non-aqueous solvents which may be used hydrocarbons, such as cyclohexane, hexane, heptane, octane, benzene and toluene; and halogen-substituted hydrocarbons, such as 1,2-dichloroethane.

Solvents having substantially greater solubility for trioxane at higher temperatures than at lower temperatures, or which, from another point of view, have very little change in precipitation temperature with substantial change in trioxane concentration, are preferred. In cyclohexane, for example, trioxane at a 35% concentration, based on the weight of solution, precipitates at 51–52° C. and at a 75% concentration precipitates out at 54–55° C. Other preferred solvents are n-heptane and n-octane.

The catalyst may be added to the solution, or it may be added to the solvent prior to the solution of trioxane therein. For best results, the catalyst should be soluble in the non-polar solvent. Because of the small quantity of catalyst employed, its solubility in the non-polar solvent can be of a very low order.

In the preferred aspect of the invention, a catalyst capable of rapid polymerization is used and preferably a catalyst which will polymerize molten trioxane in bulk to the extent of 40 weight percent in one hour at a temperature allowed to rise from 70° to 100° C. when used at a concentration of 0.01 weight percent. The procedure of this invention is particularly useful with catalysts comprising boron fluoride coordinate complexes with organic compounds in which oxygen of sulfur is the donor atom. Such complexes are described in application Serial No. 691,143, filed October 21, 1957, by Donald E. Hudgin and Frank Berardinelli.

Any of the known catalysts for the polymerization of trioxane may be used in accordance with this invention. It is known, for example, that inorganic fluorine-containing catalysts, such as antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride and fluosulfonic acid are effective catalysts for polymerizing trioxane to a tough, high molecular weight material. Other catalysts found to be effective in addition to the boron fluoride coordinate complexes and inorganic fluorine-containing materials disclosed above are boron fluoride, which is disclosed in application serial No. 691,144, also filed October 21, 1957, by Hudgin and Berardinelli, and boron fluoride monohydrate, boron fluoride dihydrate, and boron fluoride trihydrate, also thionyl chloride, organic sulfonic acids, phosphorus trichloride, titanium tetrachloride, ferric chloride, zirconium tetrachloride, aluminum trichloride, stannous chloride and stannic chloride.

The amount of catalyst used will vary depending on the nature of the catalyst and its solubility in the non-polar solvent. Generally amounts between about 0.001 and about 1.0 weight percent, based on the weight of the trioxane may be used.

The average molecular weight of the polymer will be increased even if suspended solid phase polymerization is initiated after polymerization has taken place to a considerable extent. However, the polymerization continuation step is preferably started after not more than 25% of the trioxane has been polymerized.

The trioxane concentration in the non-polar solvent will depend on the temperature of the polymerization initiation and polymerization completion and upon the nature of the non-polar solvent. Generally, concentrations between about 100 and about 900 grams per liter are suitable, and preferably between about 300 and about 700.

The temperature of the suspended phase polymerization step will depend primarily upon the nature of the solvent and to a lesser extent on the trioxane concentration and the activity of the catalyst. Generally, temperatures between about −10° and 60° C. will be used and preferably between about 0° and about 55° C.

During the polymerization initiation step, it is preferred to agitate the solution. After the initial polymer is formed and the solution is cooled, it is preferred to stop the agitation. Even when the polymerization initiation and continuation are carried out at the same temperature, within 2° C. of the precipitation temperature, it is preferred to agitate until initial polymer formation and then to stop the agitation.

When polymerization is carried out in accordance with the preferred aspects of the above-described procedures, polymers are obtained in high yields having molecular weight corresponding to intrinsic viscosities above 1.5 and usually between 2 and 3 (measured in 0.5% solution in p-chlorophenol containing 2% alpha-pinene at 60° C.). The polymers produced in accordance with this invention are useful in the preparation of molded objects of exceptional toughness and stability.

The yields of polymer produced by this invention are also high, generally above about 50% and sometimes as high as 80% of the trioxane used.

The time required for the initial polymerization step may vary from about 30 seconds to about 30 minutes, and the time for the final polymerization step from about 5 minutes to about 24 hours. For best results, the initial polymerization step is kept as short as possible and the final polymerization step is carried out for a period between about 20 minutes and about 1 hour.

*Example I*

This example illustrates the importance of the polymerization continuation step of this invention in contrast to polymerization continuation at a temperature about 10° C. above the precipitation temperature.

To a 50% trioxane solution in cyclohexane, based on the weight of the solution, there was added a boron fluoride-dibutyl etherate catalyst (0.69 gm. catalyst/1000 gm. trioxane). The mixture was agitated for fifteen minutes. At the end of that time a sample was poured out into a thin cell and rapidly cooled to 40° C. in six minutes without agitation. At the end of this time the reaction was quenched with water. A yield of 51% of polymer (based on the trioxane) was obtained, with an intrinsic viscosity of 2.96, measured as stated above. The material remaining in the original polymerization vessel was kept agitated at the original conditions for another five minutes and then quenched with water. A yield of 21% of polymer was obtained in this portion with an intrinsic viscosity of 1.17.

*Example II*

This example illustrates the importance of polymerization initiation in solution.

Seven pounds of an 85% trioxane in cyclohexane solution (based on the weight of solution) at 70° C. and ten pounds of boron fluoride-dibutyl etherate in cyclohexane solution containing 1 gram of catalyst were continuously added to a stirred reactor over a period of 2.5 hours. The reactor temperature varied from 13° to 47° C. Trioxane slurry was formed immediately upon admixture of the trioxane solution with the cold reactants in the vessel. A small amount of polymer formed on the walls of the vessel and there was no polymer in the overflowing slurry, showing that yields are very low when polymerization is not initiated in solution.

*Example III*

To a 50% trioxane solution in cyclohexane at 55° C. there was added boron fluoride-dibutyl etherate catalyst (0.92 gm./1000 gm. of trioxane). The mixture was agitated for one minute. At the end of this time the agitation was stopped and the mixture was kept at 55° C. for an hour. Then the reaction was quenched with water. A yield of 68% polymer with an intrinsic viscosity of 2.06 was obtained.

*Example IV*

To a 75% trioxane solution in cyclohexane at 63° C. there was added boron fluoride-dibutyl etherate catalyst (0.12 gm./1000 gm. of trioxane). The mixture was agitated for fifteen minutes. Then it was poured into a thin cell and cooled to 55° C. within a few minutes. It was kept at 55° C. for an hour and then the reaction was quenched with water. A yield of 29% polymer was obtained with an intrinsic viscosity of 2.13.

*Example V*

To a 35% trioxane in cyclohexane solution at 63° C. there was added boron fluoride-dibutyl etherate catalyst (1.15 gm./1000 gm. of trioxane). The mixture was agitated for 15 minutes. Then it was poured into a thin cell and cooled to 40° C. within 10 minutes. It was kept at 40° C. for an hour and then the reaction was quenched with water. A yield of 57% polymer with an intrinsic viscosity of 1.96 was obtained.

It is to be understood that the foregoing detailed description is merely given by way of illustration and that many variations may be made therein without departing from the spirit of my invention.

Having described my invention, what I desire to secure by Letters Patent is:

1. In a process for obtaining high molecular weight polyoxymethylene wherein trioxane is polymerized in admixture with a trioxane-polymerization catalyst, the improvement which comprises initiating polymerization of said trioxane in solution in an inert non-aqueous solvent and continuing the polymerization of the trioxane at a temperature not higher than about 2° C. above the precipitation temperature of said trioxane in solution.

2. In a process for obtaining high molecular weight polyoxymethylene wherein trioxane is polymerized in admixture with a trioxane-polymerization catalyst, the improvement which comprises initiating polymerization of said trioxane in solution in an inert non-aqueous solvent and continuing the polymerization of the trioxane in solution at a temperature between the precipitation temperature of said trioxane in solution and about 2° C. above said precipitation temperature.

3. In a process for obtaining high molecular weight polyoxymethylene wherein trioxane is polymerized in admixture with a trioxane-polymerization catalyst, the improvement which comprises initiating polymerization of said trioxane in solution in an inert non-aqueous solvent, cooling said solution to precipitate solid trioxane particles and continuing the polymerization of the trioxane as a dispersion of solid particles in said solvent.

4. The process of claim 1 wherein said catalyst comprises a coordinate complex of boron fluoride with an organic compound in which oxygen is the donor atom.

5. The process of claim 1 wherein said catalyst comprises a coordinate complex of boron fluoride with an ether.

6. The process of claim 1 wherein said solvent comprises cyclohexane.

7. Th process of claim 1 wherein agitation takes place during said polymerization initiation step and no agitation takes place during said polymerization continuation step.

8. The process of claim 2, wherein agitation takes place during said polymerization initiation step and no agitation takes place during said polymerization continuation step.

9. In a process for obtaining high molecular weight polyoxymethylene wherein trioxane is polymerized in admixture with a trioxane-polymerization catalyst, the improvement which comprises initiating polymerization of said trioxane in solution in an inert non-aqueous solvent, polymerizing not more than about 25% of the total trioxane in solution, cooling said solution to precipitate solid trioxane particles and continuing the polymerization of trioxane as suspended solid particles in said solvent.

10. The process of claim 9 wherein said polymerization initiation takes place at a temperature between about 10° and 110° C. and said polymerization continuation takes place at a temperature between about —10° and 60° C.

11. The process of claim 10 wherein said trioxane is present in said solution in an amount between about 100 and about 900 grams per liter.

12. The process of claim 9 wherein the polymerization continuation step is carried out in the absence of agitation.

13. The process of claim 9 wherein said solvent is a hydrocarbon.

14. The process of claim 13 wherein said solvent is cyclohexane.

References Cited in the file of this patent

UNITED STATES PATENTS

| | | |
|---|---|---|
| 2,270,135 | Mikeska et al. | Jan. 13, 1942 |
| 2,768,994 | MacDonald | Oct. 30, 1956 |
| 2,795,571 | Schneider | June 11, 1957 |

OTHER REFERENCES

Walker: "Formaldehyde," A.C.S. Monograph 120 (1953), pp. 152–153.